US010925431B2

(12) United States Patent
Contessa

(10) Patent No.: US 10,925,431 B2
(45) Date of Patent: Feb. 23, 2021

(54) AUTOMATED SMOOTHIE MACHINE USING SMOOTHIE PACKETS

(71) Applicant: Christopher Contessa, Houston, TX (US)

(72) Inventor: Christopher Contessa, Houston, TX (US)

( * ) Notice: Subject to any disclaimer, the term of this patent is extended or adjusted under 35 U.S.C. 154(b) by 270 days.

(21) Appl. No.: 16/095,891

(22) PCT Filed: Apr. 10, 2018

(86) PCT No.: PCT/US2018/026806
§ 371 (c)(1),
(2) Date: Oct. 23, 2018

(87) PCT Pub. No.: WO2018/200186
PCT Pub. Date: Nov. 1, 2018

(65) Prior Publication Data
US 2019/0343323 A1 Nov. 14, 2019

Related U.S. Application Data

(60) Provisional application No. 62/491,289, filed on Apr. 28, 2017.

(51) Int. Cl.
A47J 31/40 (2006.01)
A23L 2/02 (2006.01)
(Continued)

(52) U.S. Cl.
CPC ........... A47J 31/407 (2013.01); A23L 2/02 (2013.01); A47J 31/4403 (2013.01); A47J 43/27 (2013.01);
(Continued)

(58) Field of Classification Search
CPC .... A23L 2/00; A23L 2/385; A23L 2/02; A47J 31/4403; A47J 43/27; A47J 31/407;
(Continued)

(56) References Cited

U.S. PATENT DOCUMENTS 729,807 A * 6/1903 Stoveken ............... B30B 9/045
100/197
2,022,679 A * 12/1935 Leo .......................... B30B 9/10
100/194

(Continued)

FOREIGN PATENT DOCUMENTS

WO 2016063087 A1 4/2016
WO 2016133768 A1 8/2016
WO 20160133768 A1 8/2016

Primary Examiner — Eric S Stapleton
(74) Attorney, Agent, or Firm — US IP Attorneys, P.C.; Timothy Marc Shropshire

(57) ABSTRACT

An automatic smoothie machine having three vertical heating plates arranged in a sequential parallel manner creating a pair of food cartridge cavities. The two outer heating plates are movable and the middle heating plate is stationary. The two outer heating plates configured to provide cyclic pressure to the pair of food cartridge. Each of the pair of food cartridges are maintained within each of the pair of food cartridge cavities in a manner to allow the pre-cut dispensing end to be arranged along a bottom portion of each of the pair of food cartridge cavities in order to allow the volume of food matter to be ejected downwards. At least one sensor configured to detect dispensing of the volume of food matter and terminate the operation of the automatic smoothie machine.

11 Claims, 6 Drawing Sheets

(51) Int. Cl.
*A47J 31/44* (2006.01)
*A47J 43/27* (2006.01)
*B65D 75/58* (2006.01)
*B65D 81/32* (2006.01)
*B67D 1/00* (2006.01)
*B67D 1/08* (2006.01)

(52) U.S. Cl.
CPC ..... B65D 75/5827 (2013.01); B65D 81/3261 (2013.01); B67D 1/0001 (2013.01); B67D 1/0895 (2013.01); *A23V 2002/00* (2013.01)

(58) Field of Classification Search
CPC ............ B65D 81/3261; B65D 75/5827; B67D 1/0895; B67D 1/0462; B67D 1/0001; A23V 2002/00
USPC .......................................................... 99/483
See application file for complete search history.

(56) References Cited

U.S. PATENT DOCUMENTS

| | | | | |
|---|---|---|---|---|
| 2,491,829 | A * | 12/1949 | Palmer | A47J 37/08 99/391 |
| 2,816,501 | A * | 12/1957 | Meyers | A47J 37/0814 99/390 |
| 2,838,404 | A * | 6/1958 | Cohen | B65D 81/3446 426/113 |
| 3,159,096 | A * | 12/1964 | Tocker | B65D 33/30 100/211 |
| 3,636,855 | A * | 1/1972 | Serafini | A47J 43/20 99/483 |
| 4,122,764 | A * | 10/1978 | D'Ambra | F24C 3/14 126/265 |
| 4,316,557 | A * | 2/1982 | Benoun | B67D 1/0004 222/129.1 |
| 5,182,926 | A * | 2/1993 | Carns | A23F 3/426 62/352 |
| 5,346,097 | A * | 9/1994 | Melland | B65D 81/3288 222/132 |
| 5,460,209 | A * | 10/1995 | Jandura | G01G 13/024 141/104 |
| 5,797,519 | A * | 8/1998 | Schroeder | B67D 1/0032 222/129.1 |
| 5,802,958 | A * | 9/1998 | Hermansson | A47J 37/0611 99/349 |
| 5,848,732 | A * | 12/1998 | Brugger | B05B 11/3083 222/137 |
| 5,952,032 | A * | 9/1999 | Mordini | A23F 3/163 426/435 |
| 6,182,555 | B1 * | 2/2001 | Scheer | A47J 31/40 222/129.1 |
| 6,196,420 | B1 * | 3/2001 | Gutierrez | B67D 1/0001 222/101 |
| 6,250,208 | B1 * | 6/2001 | Helps | A47J 31/0615 99/279 |
| 6,283,625 | B2 * | 9/2001 | Frankel | A47J 43/0716 366/146 |
| 6,691,894 | B2 * | 2/2004 | Chrisman | B67D 1/0001 222/101 |
| 6,719,450 | B2 * | 4/2004 | Glucksman | A47J 43/0711 366/129 |
| 7,597,922 | B2 * | 10/2009 | Cheng | A23L 27/00 426/594 |
| 2002/0092879 | A1 * | 7/2002 | Chrisman | B67D 7/0216 222/504 |
| 2002/0148357 | A1 * | 10/2002 | Lazaris | A47J 31/3633 99/295 |
| 2003/0047080 | A1 * | 3/2003 | Wu | A47J 31/3614 99/279 |
| 2005/0235834 | A1 * | 10/2005 | Blanc | A47J 31/3633 99/279 |
| 2006/0162569 | A1 * | 7/2006 | Doglioni Majer | A47J 31/42 99/275 |
| 2007/0199453 | A1 * | 8/2007 | Rasmussen | B65D 85/816 99/279 |
| 2008/0149669 | A1 * | 6/2008 | Nicholson | B67D 1/0048 222/129.1 |
| 2008/0236403 | A1 * | 10/2008 | Cortese | A47J 31/3685 99/323 |
| 2008/0283550 | A1 * | 11/2008 | Nighy | F04B 43/0736 222/1 |
| 2008/0302251 | A1 * | 12/2008 | Rijskamp | A47J 31/4492 99/295 |
| 2010/0147157 | A1 * | 6/2010 | Tanner | A47J 31/3695 99/295 |
| 2010/0147873 | A1 * | 6/2010 | Tanner | A47J 31/407 99/295 |
| 2010/0192779 | A1 * | 8/2010 | Tanner | A47J 31/407 99/295 |
| 2011/0146497 | A1 * | 6/2011 | Sirbu Villa | A47J 31/401 99/289 R |
| 2012/0006204 | A1 * | 1/2012 | Eidenschink | A47J 31/407 99/279 |
| 2012/0315364 | A1 * | 12/2012 | Champlin | A23L 3/003 426/522 |
| 2013/0174744 | A1 * | 7/2013 | Etter | A47J 31/3633 99/295 |
| 2013/0239820 | A1 * | 9/2013 | Baldo | A47J 31/407 99/295 |
| 2013/0269536 | A1 * | 10/2013 | Gavillet | A47J 31/369 99/295 |
| 2014/0083309 | A1 * | 3/2014 | Reese | B23P 19/04 99/474 |
| 2014/0130680 | A1 * | 5/2014 | Fin | A47J 31/3638 99/295 |
| 2014/0144932 | A1 * | 5/2014 | Doelman | B67D 1/0864 222/1 |
| 2014/0272048 | A1 * | 9/2014 | Hristov | A47J 31/446 426/433 |
| 2014/0348994 | A1 * | 11/2014 | Deuber | A47J 31/407 426/425 |
| 2014/0370167 | A1 * | 12/2014 | Garden | B60P 3/007 426/233 |
| 2015/0040769 | A1 * | 2/2015 | Righetti | A47J 31/407 99/290 |
| 2015/0060481 | A1 * | 3/2015 | Murray | B65D 83/06 222/1 |
| 2015/0060482 | A1 * | 3/2015 | Murray | A47J 31/407 222/1 |
| 2015/0104550 | A1 * | 4/2015 | Oh | A47J 31/407 426/231 |
| 2015/0164262 | A1 * | 6/2015 | Dingle | A47J 31/3633 99/295 |
| 2015/0374025 | A1 * | 12/2015 | Evans | B30B 9/20 99/495 |
| 2016/0000135 | A1 * | 1/2016 | Evans | A23L 2/04 100/37 |
| 2016/0145038 | A1 * | 5/2016 | Apone | B65B 29/02 426/115 |
| 2016/0309763 | A1 * | 10/2016 | Jetton | A23L 29/284 |

* cited by examiner

AUTOMATED SMOOTHIE MACHINE USING SMOOTHIE PACKETS

RELATED APPLICATIONS

This application claims the benefit of U.S. Provisional Application No. 62/491,289 filed Apr. 28, 2017, titled "Automated Smoothie Machine Using Smoothie Packets", which is incorporated by reference in its entirety.

FIELD OF INVENTION

This invention relates to the general field of beverage makers, and more specifically thick beverages such as smoothies, created with the application of heat onto pre-manufactured food packets.

BACKGROUND

Presently consumers are motivated by the ease and convenience of modern products designated for consumption. Beverages specifically are the easiest of consumer goods to maintain for purchase and consumption. For this reason, many individuals are faced with many options that lack nutritional value or a standard regarding integrity of health maintenance. Additionally, with modernization of convenient beverage access, such as through delivery and drive through services, the ability to consume beverages that may act as meal replacements, such as milk-shakes or smoothies, is an ever-popular demand.

Smoothies have become globally popular since the bourgeoning of health awareness in the 1990's. With blenders falling in price and smoothies advertised as a healthy alternative to traditional meal habits, smoothies and their partnered blenders fell into mass marketing. With smoothies becoming a bought and sold consumer good upon the popularization of the beverage, many consumers have sought to replicate and customize the beverages which they purchase within the convenience of their own homes as well. Smoothies are a desirable beverage in that they can be mixed with a variety of different edible goods, including various fruits, vegetables, juices, dairy products, sweeteners, supplements, and nutritional additives (such as proteins) to create a nutritional and satisfying beverage. Unfortunately, smoothies also require the use of bulky and often pricey ingredients. Also, the mixing and creation of a smoothie is traditionally executed through using a blender with sharp blades to cut up and emulsify desired smoothie contents. These blades can be dangerous, as well as blenders consistently being a hassle to clean and store.

Another problem many consumers face is the necessity to have the ingredients desired to prepare a custom and individually oriented smoothie readily available. This can lead to money being put into produce, juices, and other desired contents that may not be used in their entirety and consequentially wasted. Furthermore, the keeping of items desired to blend a smoothie also requires that one keep those ingredients available, some of which may expire prior to finding the time or desire to blend a smoothie. When a consumer does find themselves in the process of making a smoothie, it requires manual participation, including but not limited to the purchase of ingredients and the preparation of ingredients (including cutting and freezing). In the end, any extra smoothie made that is not able to be consumed will be wasted as they do not store well, and the thick consistency may be lost to melting.

SUMMARY

In one embodiment, an automatic smoothie machine having a cavity configured to receive a food cartridge having an external liner with a pre-cut outlet and a volume of food matter container therein. The food cartridge is inserted within the cavity, with the pre-cut outlet arranged along a bottom side of the cavity. The at least two heating plates arranged along opposite sides of the food cartridge configured to apply cyclic pressure and heating to the food cartridge. The cavity and the two heating plates are configured to allow the dispensing of the volume of food matter contained inside the food cartridge without the volume of food matter directly contacting the at least two heating plates. The two heating plates may be vertical heating plates organized along opposite sides of the food cartridge, and are attached to at least two distinct movable arms arranged along opposite sides of the food cartridge. At least one sensor configured to detect a completed dispensing cycle of the volume of food matter from inside the food cartridge to terminate the cyclic pressure and heating. The at least two movable arms arranged along opposite sides of the food cartridge initiate at least one sensor when the volume of food matter within the food cartridge is dispensed downwards towards through the pre-cut outlet. The food cartridge is extracted from within the cavity by an end user pulling upward along a top side of the food cartridge. A heat sensor configured to measure a combined heat temperature of the at least two heating plates and send a signal to a controller to adjust heat output when the combined heat temperature reaches a threshold temperature value. The cyclic pressure gently nudge the volume of food matter within the food cartridge which is simultaneously defrosting along the inner perimeter of the food cartridge as a result of the heating supplied by the at least two heating plates. A controller configured to continuously adjust a heating output value for a set duration in order to permit the volume of food matter within the food cartridge to dispense along the pre-cut outlet.

An automatic smoothie machine having three vertical heating plates arranged in a sequential parallel manner creating a pair of food cartridge cavities. The pair of food cartridge cavities are configured to each receive one of a pair of food cartridge connected by a unifying liner connecting a top portion of each of the pair of food cartridges, each of the pair of food cartridge comprising an external liner with a pre-cut dispensing outlet and a volume of food matter container therein. Two of the three vertical heating plates are movable and are arranged along opposite and outer sides of the pair of food cartridge cavities and one of the three vertical heating plates in non-movable and arranged in between the pair of food cartridge cavities. The three vertical heating plates are configured to provide controlled heating and the two of the three vertical heating plates arranged along opposite and outer sides of the pair of food cartridge cavities are configured to provide predetermined cyclic pressure to the pair of food cartridges maintained within the pair of food cartridge cavities. Each of the pair of food cartridges are maintained within each of the pair of food cartridge cavities in a manner to allow the pre-cut dispensing end to be arranged along a bottom portion of each of the pair of food cartridge cavities in order to allow the volume of food matter to be ejected downwards. The two of the three vertical heating plates arranged along opposite and outer sides of the pair of food cartridge cavities are each attached to one of two distinct movable arms controlled by a motor. Each of the two distinct movable arms initiate at least one sensor to terminate the predetermined cyclic pressure and controlled heating when the volume of food matter within the food cartridge is dispensed downwards towards through the pre-cut dispensing outlet. The at least one of the two distinct movable arms may initiate a subsequent sensor to terminate the operation of the automatic smoothie machine after the at least one sensor is initiated. The unifying liner may be used to extract each of the pair of food cartridge from each of the pair of food cartridge cavities. A controller configured to continuously adjust a heating output value for a set duration to allow the volume of food matter within each of the pair of food cartridges to dispense along the pre-cut dispensing outlet.

An automatic smoothie machine, comprising a first outer heating plate, a second middle heating plate, and a third outer heating plate arranged in a sequential parallel manner whereby creating two separate chambers configured to each receive a single food cartridge. A single food cartridge comprising an external liner with a pre-cut dispensing end and a volume of food matter container within the external liner. The two separate chambers comprising a first chamber comprising the first outer heating plate and the second middle heating plate arranged along opposite ends. The second chamber comprising the second middle heating plate and the third outer heating plate arranged along opposite ends. The first outer heating plate and the third outer heating plate are configured to apply cyclic pressure onto a single food cartridge inserted within both the first chamber and second chamber, while the second middle heating plate is stationary. The pre-cut dispensing end of each of the single food cartridge, to be arranged along a bottom side of the first chamber and the second chamber, to allow the volume of food matter to be ejected downwards. The first heating plate and the third heating plate are each attached to one of two movable arms controlled by a motor. Each of the two movable arms initiate at least one sensor to terminate the cyclic pressure and when the volume of food matter within the single food cartridge is dispensed downwards towards the pre-cut dispensing end. At least one of the two movable arms may initiate a subsequent sensor to terminate the operation of the automatic smoothie machine after the at least one sensor is initiated. A controller configured to continuously adjust a heating output value for a set duration to allow the volume of food matter within each of the pair of food cartridges to dispense along the pre-cut dispensing end.

A method of dispensing smoothie contents onto a receptacle, the method comprising the steps of: (1) pre-cutting a bottom portion of at least one smoothie packet, (2) inserting the at least one smoothie packet into an individualized packet receiver cavity, (3) providing heat to two heating plates arranged in a parallel manner along opposite sides of the individualized packet receiver cavity, (4) simultaneously with providing heat, compressing and retracting in a systematic cycle the two heating plates, (5) determining, by means of at least one sensor, the contents of the at least one smoothie packet has been dispensed, and (6) retracting the two heating plates in response to feedback received from the at least one sensor.

DETAILED DESCRIPTION

Figure 1:
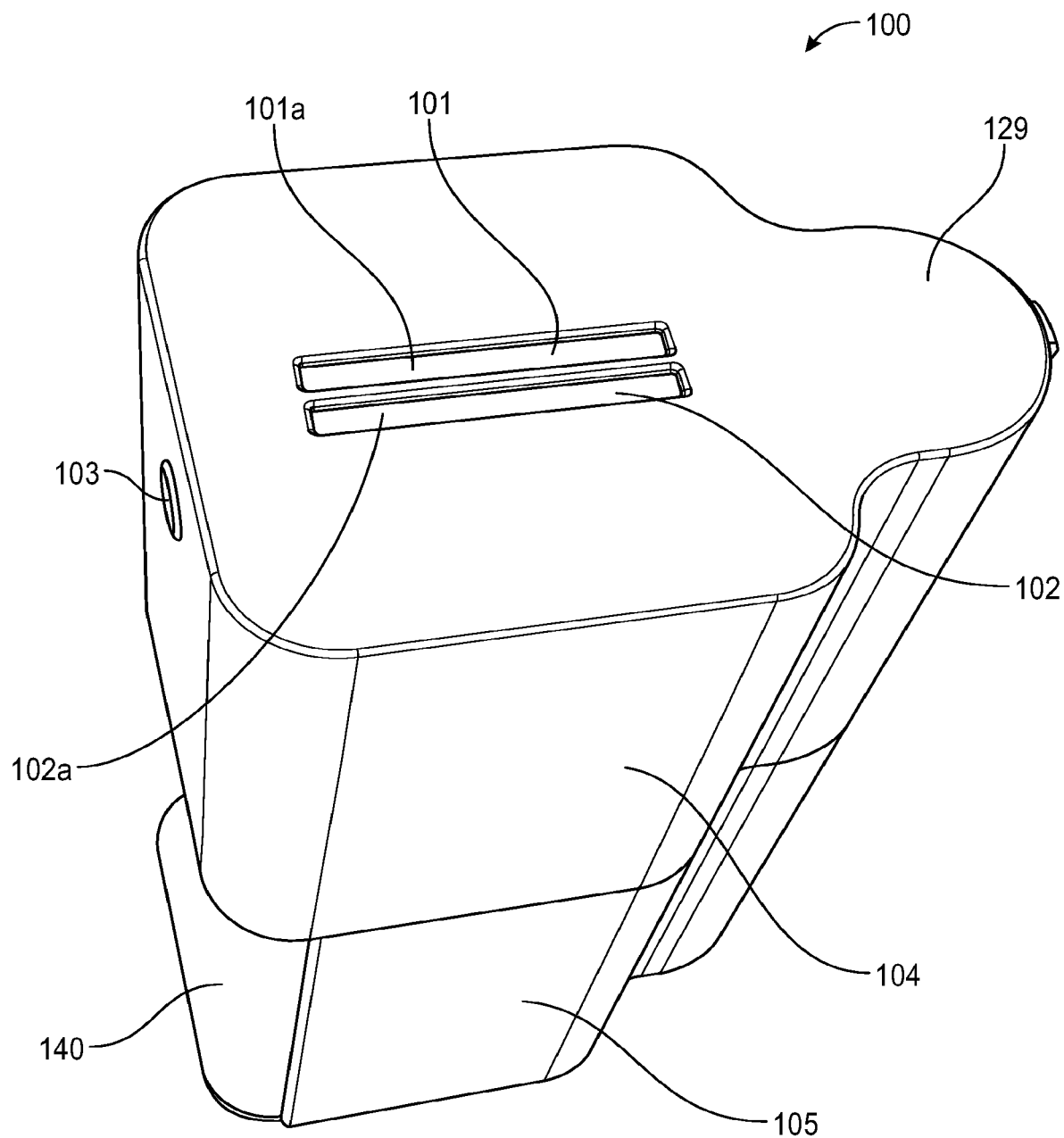
FIG. 1 is a schematic representation of a top perspective view of one embodiment of the automated smoothie machine.

The traditional platform for the development of a smoothie is based in a device which uses sharp blades to break up and blend desired fruits, vegetables, ice, liquid additives, and other solid or semi-solid edible content, into a smoothie medium. Often these blades allocated for blending are placed within a container that may hold volumes of solid material prior to blending, as well as the volume of liquid present after blending. Additionally, in traditional smoothie production devices, the blades function through being attached to a mechanical base which powers the blades as well as connects the blades and power supply through a series of buttons placed on the exterior of the base of the device. The electronics are beneath the receptacle designed for smoothie containment to allow the blades to remain at the interior base of the receptacle for smoothie containment. This format of smoothie production may be dangerous due to the sharp blades which blend the edible materials into a smoothie medium. Moreover, this format requires manual cleaning after usage, as the receptacle for smoothing blending and containment comes into contact with blended materials; any residual blended food remains must be cleaned away after the smoothie has been dispensed. This cleaning requirement also leaves the potential for consumers to make physical, and potentially dangerous, contact with the device's blades.

Inversely, the system described herein offers an effective alternative to smoothie production which requires the use of blades. To satisfy a longstanding consumer desire for a device which creates thick beverages in a manner that does not require extensive cleaning, contact with dangerous components such as blades, and keeps disposable bi-product at a minimum, the automated smoothie machine to be described here has been developed. In this case, the term "smoothie" is characterized as a thick, semi-solid or viscous beverage that may be comprised of raw or frozen fruits, vegetables, or any food matter; alongside any fruit or vegetable additives, the beverage may include edible liquids of consumer choice including but not limited to water, dairy product, protein products, juices, or sweeteners such as honey, syrup, or sodas; furthermore edible additives may be augmented or interchanged with other substances of choice, such as ice cream or alcohol, in order to make a smoothie that is similar to a milk shake or cocktail. Through pre-made packets which contain smoothie medium combinations, a smoothie tailored to a specific consumer's ideal health needs and flavor preferences is able to be provided by the automated smoothie machine without the use of blades. These "packets" are characterized as pre-made and pre-frozen smoothie mediums which are inserted into a heat resistant sleeve that may be placed into the automated smoothie machine for automatic thawing and dispensing with minimal cooperation from the consumer.

The automated smoothie machine is an on-demand device which functions to take packets of various pre-frozen smoothie combinations and transform them into a ready-to-drink smoothie. This is done without the use of blades; additionally, any manual cleaning is avoided in that the packets are the only subject which comes in contact with the smoothie mixture, with the packets being simply disposed of after the smoothie has been dispensed from the packets. Traditionally, a user is required to manually pour or dispense smoothie contents from the smoothie receptacle in which the blades blend the smoothie contents within, but rather, with this automated smoothie machine, the user is uninvolved in the dispensing of present smoothie medium, as the automated smoothie machine will mechanically dispense the smoothie contents into a cup, bowl, or other form that may hold food contents, directly from the packets aforementioned. Consequentially, the empty packets are disposed of, and there remains no dangerous blades or mixing receptacle to be cleaned or contacted by the consumer.

Figure 2:
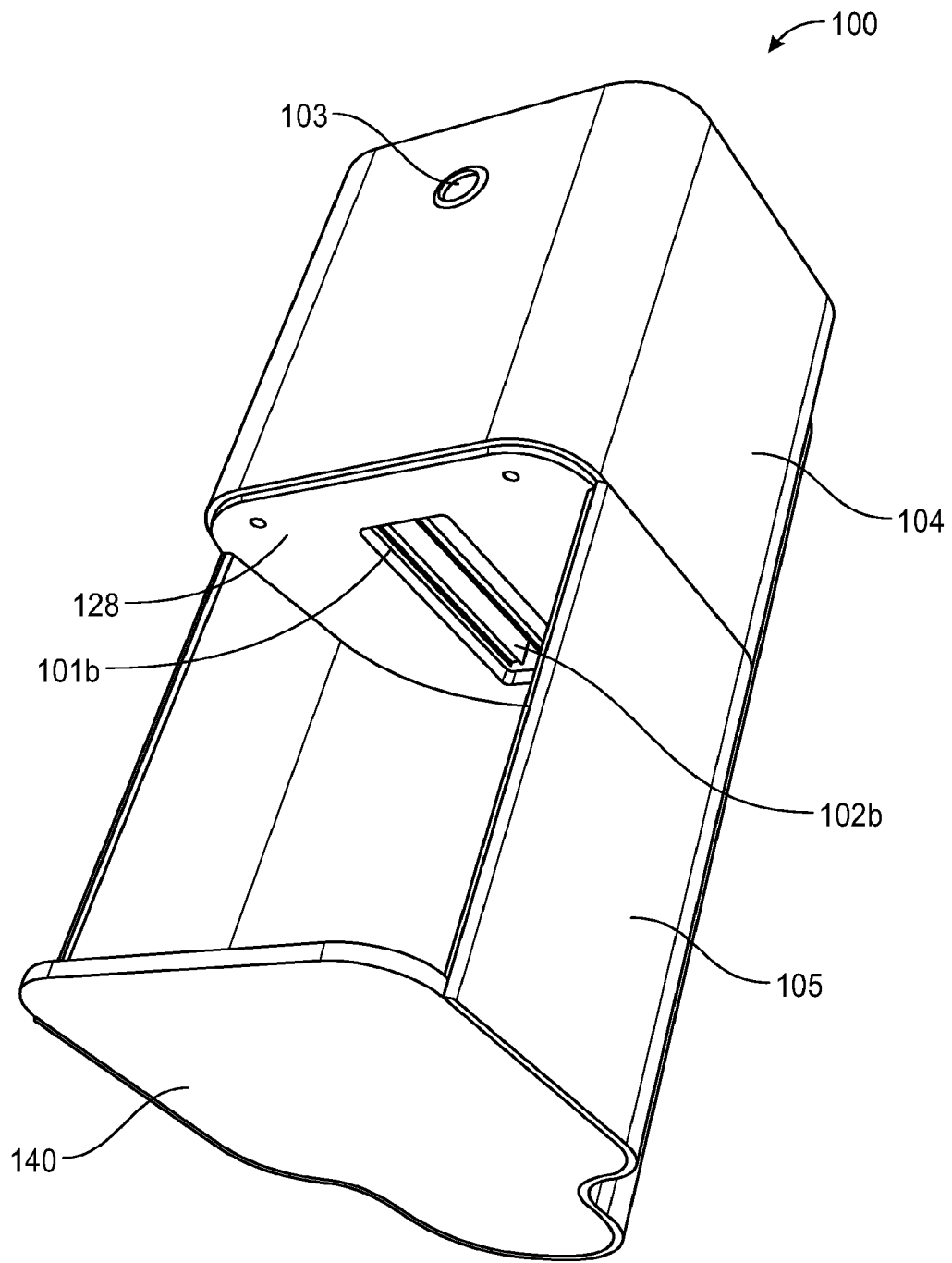
FIG. 2 is a schematic representation of a bottom perspective view of one embodiment of the automated smoothie machine.

The general methodology which the automated smoothie machine engages in order to transform pre-made frozen packets of smoothie medium into readily consumable liquid smoothie medium proceeds as follows: a consumer may take the pre-packaged and pre-frozen smoothie packet and place it into the automated smoothie machine through an opening maintained at the top of the automated smoothie machine; concurrently the consumer may press the singularly available button maintained on the front upper portion of the automated smoothie machine which will trigger the automated smoothie machine to heat the packets through a series of internal components, followed by the automatic dispensing of the packet contents into a consumer-designated liquid receptacle. This takes place through the engagement of the various mechanical, physical, and aesthetic characteristics of the automated smoothie machine as follows:

Within FIG. 1 and FIG. 2 illustrate the external appearance of the automated smoothie machine. The base of the automated smoothie machine is comprised of a U-shaped cabinet space in which a liquid receptacle of the consumers' designation may be placed in order to receive dispensed smoothie medium. The cabinet space may be made of any resilient material such as plastic, glass, metal, acrylic, polymer, or other material which maintained at room temperatures, as well as withstand any heat or cooling it may be subjected to during the functioning of the automated smoothie machine. The cabinet space maintains a bottom platform made of a material that maintains the same qualifications of the cabinet space itself which the consumer designated liquid receptacle may be placed on in order to receive the dispensed smoothie medium. The cabinet space also is capped with a platform made of a material that maintains the same qualifications of the cabinet space itself which upholds the mechanical portions of the automated smoothie machine.

The portion above the cabinet space of the automated smoothie machine is a completely enclosed cabinet space that encapsulates the electronic and mechanical portions of the automated smoothie machine, known as the electronic and mechanical upper cabinet. The enclosed cabinet space is defined by curved edges in the front right and left corners. The back of the automated smoothie machine is flat, with the back left and right corners being maintained at a 90-degree angle, the backing being made up of either the same or different materials that maintain the same qualifications designated to the materials which comprise the cabinet space itself. The top of the automated smoothie machine is flat, with a top opening provided large enough for two packets to be placed into the automated smoothie machine for preparation. The top of the automated smoothie machine may be removable to allow the cleaning of the plates, for while the user is pulling the smoothie packets out with the intent to discharge the packaging, this may result in food residue being deposited onto the plates, which will require cleaning by the user. The roof of the cabinet space acts as the platform which the mechanical and electrical components rest above, designated as the median platform. This median platform maintains a bottom opening visually and physically the same as the top opening; this opening maintains the purpose of hovering above the consumer designated liquid receptacle to provide the opening by which the packets release the smoothie medium through, and into the consumer designated liquid receptacle.

FIG. 1 is an illustration of the automated smoothie machine from a top side perspective view wherein the top portion of the packet receiving cavity is shown. In one embodiment of the disclosure, the smoothie machine 100 may have a solid upper cabinet 104 which holds the mechanical and electrical components, and a lower cabinet 105 configured to receive a receptacle (not shown) to maintain the smoothie contents dispensed from the smoothie packets housed above it. In addition, on the face of the upper cabinet 104, there is a singular start button 103 centered on the upper portion, this start button 103 initiates the process of smoothie packet thawing and dispensing, and is the initiate button. The start button 103 may be framed by a circular LED strip that is lit when the automated smoothie machine 100 is on and functioning. One at a time, smoothie packets are inserted on the top portion of the upper cabinet 104 through a packet receiving cavity 101/102. The smoothie machine 100 is configured to permit at least one packet to be inserted into the packet receiving cavity before initiating the process to heat and dispense the smoothie beverage into a receptacle (not shown).

In one embodiment, an automated smoothie machine 100 having an upper cabinet 104 and a lower cabinet 105, wherein the upper cabinet 104 contains the electrical and mechanical components necessary to derive a volume of smoothie contents into a receptacle, and the bottom cabinet 105 contains supporting framework and a bottom base 140 to allow a receptacle (not shown) to be fitted underneath the first packet receiving cavity 101 and the second packet receiving cavity 102 to receive the contents of the smoothie packet(s). The automated smoothie machine 100 having a first packet receiver opening 101 and a second packet receiver opening 102 configured in a vertical and parallel manner to each receive a smoothie packet within its empty compartment. In an alternative embodiment, the automated smoothie machine 100 may have a first packet receiver opening 101 and a second packet receiver opening 102 configured in a horizontal and parallel manner to each receive a smoothie packet within its empty compartments, and then switch to a vertical orientation in order to dispense. The automated smoothie machine 100 having a top portion of the first packet receiving opening 101a and a top portion of the packet receiver opening 102a arrange along a central region within a top base 129.

FIG. 2 is an illustration of the automated smoothie machine from a bottom side perspective view wherein the bottom portion of the packet receiving cavity is shown. The smoothie packets are inserted along the upper cabinet 104 through a top portion packet receiving cavity 101a/102a, and are maintained in the packet receiving cavity 101/102 during the heating process, and are dispensed along the bottom portion of the packet receiving cavity 101b/102b as shown in FIG. 2.

Figure 7:
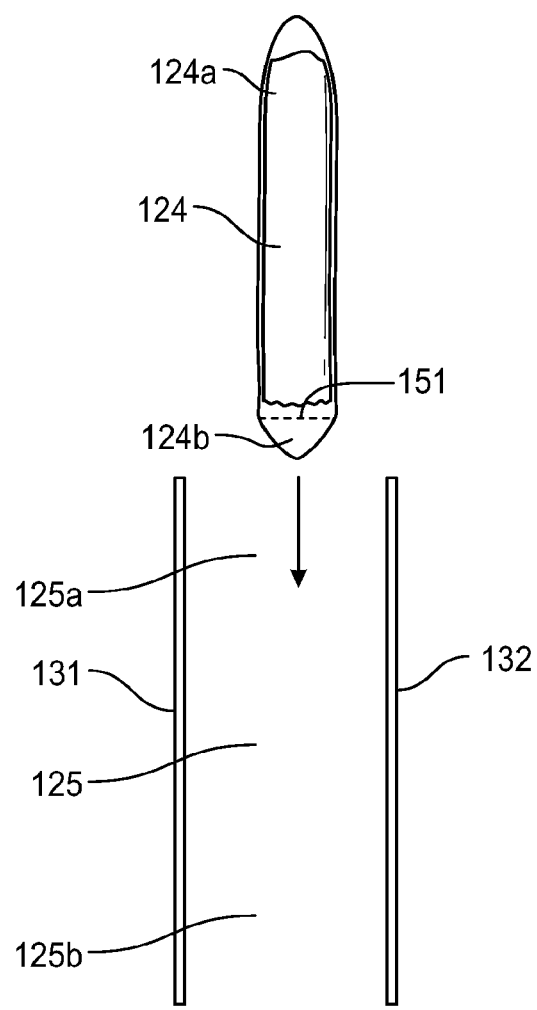
FIG. 7 is a schematic representation of one embodiment of a single food packet being inserted into the automated smoothie machine.

The automated smoothie machine 100 having a bottom portion of a first packet receiver cavity 101b and a bottom of the second packet receiver cavity 102b arranged along a central region along the middle base 128. As the first packet 121 and the second packet 122 (as shown in FIG. 7) are inserted into the first packet receiver cavity 101 and second packet receiver opening 102 (as shown in FIG. 1) their contents will be dispensed along the bottom of the first packet receiver cavity 101b and the bottom of the second packet receiver cavity 102b into a receptacle (not shown) inside the lower cabinet 105 of the automated smoothie machine 100.

Figure 3:
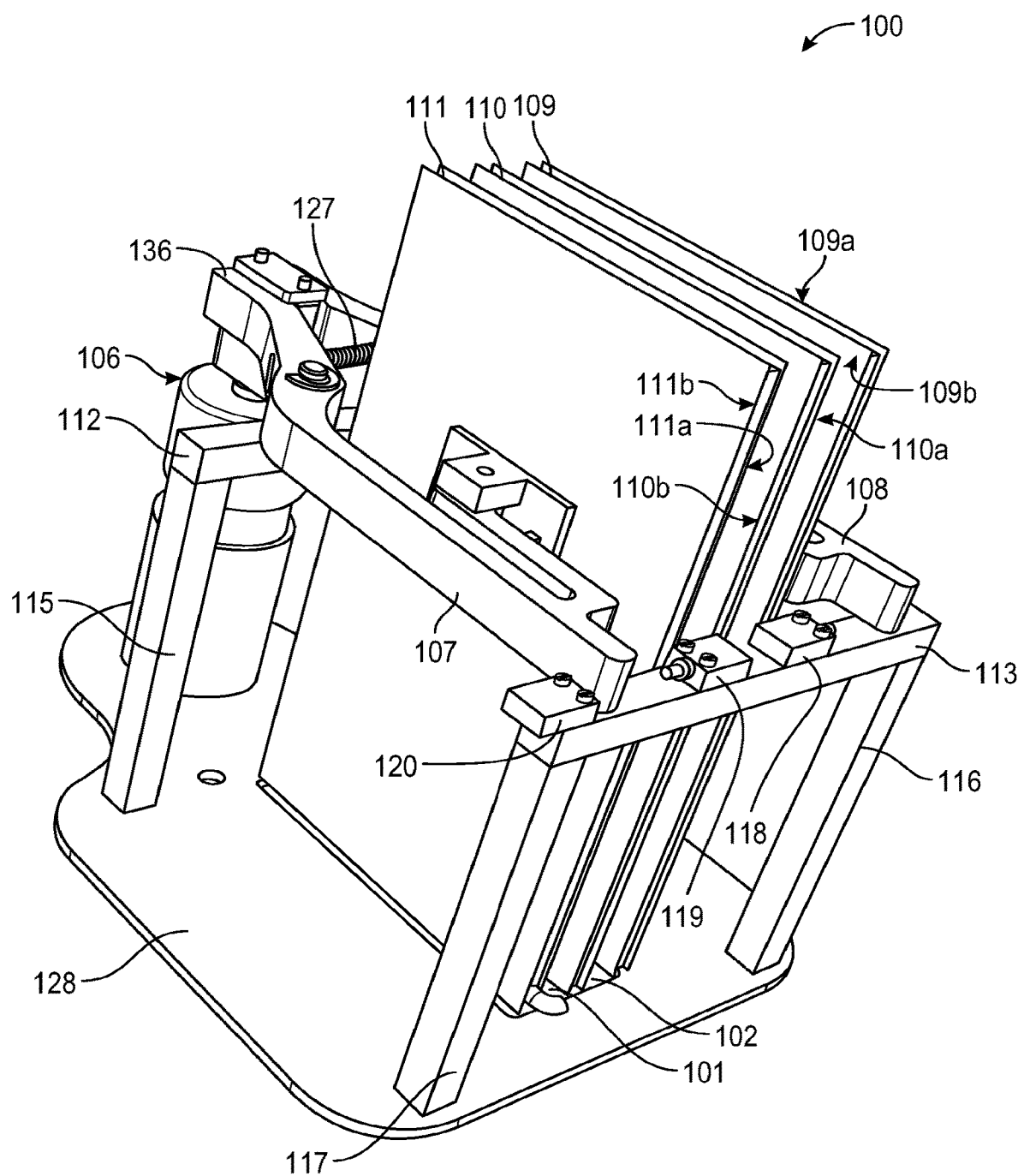
FIG. 3 is a schematic representation of a perspective view of the components of one embodiment of the automated smoothie machine.

FIG. 3 is an illustration of a perspective view of the components of the automated smoothie machine. The central mechanism to the automated smoothie machine are the three vertical heating plates 109, 110, and 111 respectively. These three heating plates 109, 110, and 111 are large, flat, rectangles that are organized in a vertical manner through the center of the electrical and mechanical upper cabinet 104. Although, these three heating plates 109, 110, and 11 may be of any shape, size and arranged at any available angle (i.e. horizontal orientation) and would not depart from the scope of the invention. They each are characterized by having heating components within each heating plate which are designed to heat and thaw the packets which contain smoothie medium. The three heating plates 109,110, and 111 are all the same size, shape, and make-up, spanning the height of the electrical and mechanical upper cabinet 104, from the top base 129 to the middle base 128. In an alternative embodiment, the three heating plates 109,110, and 111 may be of varying sizes, shapes, and make-up, wherein the outer plates 109 and 111 may have heating elements only along their interior sides and the center plate 110 may have a heating element on both sides. In an alternative embodiment, the automated smoothie machine 100 may be configured to accept a single packet at a time, and in this instance, may initiate heating of the center heating plate and a single side plate trigged by the insertion of the smoothie packet within the packet receiving cavity. Moreover, as shown in FIG. 7, the automated smoothie machine 100 may be designed to suit a single smoothie packet 124 at a time, and may contain at a minimum two heating plates, a first vertical heating plate 131 and a second vertical heating plate 132, configured to heat a single smoothie packet 124 at a time, each of the two heating plates acting on one side of the single smoothie packet 124.

Anchored into the median platform on the front side and the backside of the three heating plates are two support systems which support all other mechanical and electrical components present. They are organized horizontally across the width of the back and front of the electrical and mechanical upper cabinet 104. These support systems are characterized by each having a post anchored into each corner of the electrical and mechanical upper cabinet interior, with a post of the same make-up and appearance resting across the top of the back two posts individually and the front two posts individually in a left to right, horizontal fashion. This forms two squares frames in the front of and in the back of the three heating plates. The two movable arms 127 and 128 are maintained in an elevated position by a back support 112 along the back of the automated smoothie machine 100 and by a front support 113 along the front of the automated smoothie machine 100. The back support 112 is maintained by right back support (not shown) and left back support 115. Similarly, the front support 113 is maintained by a right front support 116 and a left front support 117.

Resting behind the back support 112 is the cylindrical base motor 106 for the arm component which assists the functioning of the heating plates. This cylindrical base motor 106 powers the mechanical components of two mechanical arms 127 and 128. The motor 106 having a cylindrical base 36 is connected to two mechanical arms 127 and 128 which travel around the outside of the furthest left heating plate 111 and furthest right heating plate 109, both meeting and anchored into the cylindrical arm base 136 behind the back support 112. Each movable arm is concurrently anchored to the heating plate it rests next to, the left movable arm 107 being anchored into the furthest left heating plate 111, and the right movable arm 108 being anchored into the furthest right heating plate 109. Each arm is anchored into the cylindrical arm base 136, resting on the back support 112, the end tip of each arm stopping at a resting position on the front support 113. Although connected at the top of the cylindrical arm base 136, the arms splay out and do not touch at the front, rather they rest on the front support 113. They each stop at a resting position on the top of the front support 113, the right movable arm 108 on resting on the right, top corner of the front support 113, and the left movable arm 107 resting on the left, top side of the front support system. The resting position of either arm on the front support 113; the left arm rests between two sensor buttons and the right arm maintains a sensor button to the left interior of its resting position. The three sensor buttons, sensors one through three, exist as to aid in the mechanical functioning of the automated smoothie machine 100. The third button sensor 120 sits on the top outer-left corner of the front support 113. The second button sensor 119 rests parallel of the left heating plate, organized just left of the center of the front support 113. The first button sensor 118 rests parallel to the right heating plate, organized just right of the center of the front support 113.

The automated smoothie machine 100 having an electric motor 106 having two movable arms: first movable arm 107 and second movable arm 108 extending on opposite sides of a spring 127 maintained between the movable arms, the spring 127 is configured to allow the two movable arms to extend and contract, as needed. Three heat plates 109,110, 111 as shown in FIG. 3 arranged in a parallel manner whereby the first movable arm 107 attached to the left vertical heat plate 111 along the outer surface area of the left heat plate 111b and the second movable arm 108 attached to the right heat plate 109 along the outer surface area of the right heat plate 109a, and the center heat plate 110 is maintained between the right heat plate 109 and the left heat plate 111 in an equidistant manner.

The electrical board (not shown) rests up against the interior of the left front support 117 and left back support 115; in this position, the electrical board forms an interior wall to the left side of the left heating plate 111.

The two mechanical arms 107 and 108 attached to the outer heating plates are mechanically moved by the motor 106 by which each arm is attached to, the motor 106 having a cylindrical base 136 behind the back support 112. The arms initiate movement from the cylindrical base 136 in an in-and-outward fashion to compress packets housed within the packet receiving cavity.

The initiation of the mechanical functions of the automated smoothie machine is engaged by an individual manually pre-cutting the bottom side of each individual packet, inserting each smoothie packet into the packet receiver opening on top of the upper cabinet 104 and pressing a start button 103 on the front of the automated smoothie machine 100 to start the process. A packet is placed between the center heating plate 110 and the left heating plate 111, as well as a packet being placed between the center heating plate 110 and the right heating plate 109.

The three heat plates 109, 110, and 111 are arranged in a parallel and sequential manner, starting from the right side to the left side: the outer surface area of the right heating plate 109a, the inner surface area of the right heat plate 109b, the back surface area of the center heat plate 110a, the front surface area of the center heat plate 110b, the inner surface area of the left heat plate 111a and the outer surface area of the left heat plate 111b. The center heat plate 111 may be stationary, while the right heat plate 109 may attached to the second movable arm 108, and the left heat plate 111 may attached to the first movable arm 107. In an alternative embodiment, wherein there is only a single opening 125 (as shown in FIG. 7), then the first movable arm 107 may be attached to a first heating plate 131 and a second movable arm 108 may be attached to a second heating plate 132 (as shown in FIG. 7) allowing both plates (131 and 132) to move towards and away from one another in absence of a middle vertical heating plate 110 to heat only a single packet at a time. Alternatively, a first movable arm 107 may be attached to a first vertical plate 131 and a second vertical plate 132 may be stationary, allowing only a first vertical plate 131 compress and extend towards a non-movable second vertical plate 132, but still provide the same overall functionality, which is to heat packet to allow for disposal of the food contents 134 into a receptacle 135.

The right heating plate 109 and the left heating plate 111 are configured to systematically compress and extend until the food contents within a packet are dispensed into a receptacle, and then at least one sensor is triggered to initiate a termination sequence for the automated smoothie machine 100. In one embodiment, the right heating plate 109 and the left heating plate 111 are configured to systematically compress and extend due to the application of force being provided from the second movable arm 107 and the first movable arm 108, respectively, until the food contents within a packet are dispensed into a receptacle which then triggers the first movable arm 107 to trigger the second button sensor 119 and the second movable arm 108 to trigger the first button sensor 118. After both the first button sensor 118 and the second button sensor 119 are triggered, then the two movable arms 107 and 108 expand and at least one arm from the two movable arms triggers the third button sensor 120 to terminate the operational sequence and reset the automated smoothie machine 100.

The left heating plate 111 is to the left of the first receiver cavity 101 and the right heating plate 109 is to the right of the second receiver cavity 102, whereas the center heat plate 110 is aligned along a surface area to the right of the first receiver cavity 101 and to the left of the second receiver cavity 102 and all three vertical heating plates are perpendicular to the middle base 128.

As is generally understood, in order for the automated smoothie machine to initiate the process of heating and compressing the smoothie packets requires electrical power, proper electrical circuits, and logical computing circuitry. Firstly, the automated smoothie machine must be plugged into the AC power of a wall, which will then convert into a DC power supply. The micro-controller having program logic provided thereto will check to make sure that the previous cycle has finished. If it hasn't, only the DC relay closes to reset the plates. If micro-controller determines that the previous cycle has finished, then the process waits for the user to initiate the start of the process by momentarily pressing a start button.

When the start button 103 of the automated smoothie machine 100 is pushed, the twelve-volt DC as well as the AC relay will close. Upon this occurrence, the cylindrical base motor will be initiated, power is supplied to the temperature controller and heat plates, causing each arm of the automated smoothie machine's mechanical component to begin a fluctuation of the in-and-outward movement to compress the smoothie packets. This serves to fluctuate the heating plates which each arm is anchored into, causing each packet to be pressed against the central heating plate in a repetitive motion. The temperature controller turns heating plates on until they reach approx. 55 degrees Celsius (approx. 131 degrees Fahrenheit) and then turns the heat plates off until the heat plates drop several degrees, and then they are turned on until they reach 55 degrees Celsius (approx. 131 degrees Fahrenheit) (cycle continues until the process terminates). Alternative temperature settings are contemplated, and may be configured programmatically, that would not take away from the invention as disclosed. The plate open microswitch, the third button sensor 120, cycles "open and closed" with each cycle.

To effectively compress the smoothie medium within the packets and prepare it for dispensing, the heating plates are warmed through a power supply provided to the temperature controls; the heating plates are warmed as to support the compression process through melting the frozen smoothie medium in unison with the compression of the smoothie medium packets. The packets are designed to withstand the elevated temperatures of the heated plates, while still allowing access to partially liquefy the smoothie medium held within the packets. When the temperature control is provided power, the micro switch allocated for the heating plates is switched on, allowing for the warming of the plates.

The heating elements that allow for the heating of the heating plates may be general purpose heating element, or in example, an electric heating element with temperature controls, or a general purpose solid surface or coiled rope heating element, as they are contained within the three heating plates that are designed to compress the packets of smoothie medium. The temperature control electrical component allows for the automated smoothie machine to switch between an "on" and "off" state, wherein only the plates turn on/off, and not the entire machine (meaning the arms are still moving/compressing, but the heating elements are turned on/off based on temperature measured by the temperature control). This switching between "on" and "off" temperature control states specifically provides that the heating plates maintain a correct temperature to assist in the dispensing of smoothie medium from the smoothie packets. The compression process by the heating plates, in accompaniment with the other mechanical functioning of the automated smoothie machine, will continue for approximately a few minutes, during which time the contents of the smoothie packets will dispense from the packets through the process of melting, compression, and gravity forcing the smoothie medium down and out of the packets; the smoothie medium, upon exiting the smoothie packet, will concurrently drop into the consumer designated receptacle through the opening in the median platform. The contents of the smoothie packet may be heated in less than ten minutes, wherein the time range to allow for the smoothie to dispense from the smoothie packet is dependent upon the consistence, ingredients and other factors of the packets and the environment, as well as the heating element and temperature being applied to exteriors the smoothie packets.

As the process of heating the smoothie packets continues, the automated smoothie machine will continue the process of compressing and heating the packets. Then, the packets begin to lose volume due to the smoothie medium being heated and released through the opening in the base and into the consumer designated liquid receptacle.

The right arm and the left arm move in unison and may move independently. When both smoothie packets contents have been released into a receptacle, within one more cycle, both the first button sensor 11 (a.k.a. Process Finished Micro-Switch #1) and the second button sensor 119 (a.k.a. Process Finished Micro-Switch #2) will have closed. As the smoothie packet in the right packet cavity is released into a receptacle, the right arm no longer having any barrier to obstruct its compression, will press against the first button sensor 118 (a.k.a. Process Finished Micro-Switch #1) to indicate complete dispensing of the right smoothie packet. Similarly, as the smoothie packet in the left packet cavity is released into a receptacle, the left arm will no longer having any barrier to obstruct its compression, will press against the second button sensor 119 (a.k.a. Process Finished Micro-Switch #2) to indicate complete dispensing of the left smoothie packet.

The automated smoothie machine 100 will continue to run until both the first button sensor 118 (a.k.a. Process Finished Micro-Switch #1) and the second button sensor (a.k.a. Process Finished Micro-Switch #2) are triggered as completed. Then, the process continues to run until the logic processor determines that the third button sensor 120 (a.k.a. Plate Full-Open Micro-Switch) is also triggered, when the right and left plates come to the "full open" position and then outer switch will close. Once the outer switch (a.k.a. the third button sensor 120 or Plate Full-Open Micro-Switch #3), is determined to be closed, then the process terminates. Finally, the AC controller relay and the gear motor relay open indicating turning off the automated smoothie machine.

As aforementioned, the mechanical arms will cease to contact sensors one through three as the contents of the smoothie packets fail to provide resistance to the heating plates, indicating a ceasing of function being necessary. Upon this occurrence, the automated smoothie machine will reset back to the initial starting position of all mechanical and electrical functions, after which an individual may safely remove of and dispose of empty smoothie packet liners along the top of the packet receiver cavities 101,102.

The automated smoothie machine requires electrical circuitry to facilitate its operation. To start, the power is received when an electrical plug is plugged into an electrical power outlet by a user, and power is supplied to the DC power supply, temperature controller, and heating plates, and other components interconnected within the circuit. The DC power supply provides a direct 5 volts and 12-volt output to the logic processor and the motor. The temperature controller is connected to the heat plates by means of an intermediary thermal fuse and an AC relay back into the logic processor. The temperature controller may be a closed loop controller with hysteresis controlling a galvanically isolated SCR. The logic processor is in direct communication with the first button sensor 118 (a.k.a. process finished micro-switch #1), the second button sensor 119 (a.k.a. process finished micro-switch #2), the turn on-off button, the third button sensor 120 (a.k.a. plate open micro-switch #3), and 12-volt DC delay to the motor and LED lights.

In one embodiment of the disclosure wherein the automatic smoothie machine may comprise insulation to prevent the heat produced by the plurality of heat plates to be expanded outwards towards the casing or exterior walls of the automatic smoothie machine. In one embodiment of the disclosure, the exterior plastic walls of the machine may be insulated. In a preferred embodiment, the backs of the two exterior heating plates 109, 111 (not the center heating plate 110) as shown in FIG. 3 will have thin insulation on them to push the heat towards the packets. The automatic smoothie machine design creates a chimney for air to be sucked in from the bottom and rise through the top to allow for cooling and release of heat created by the plurality of heating plates.

Figure 4:
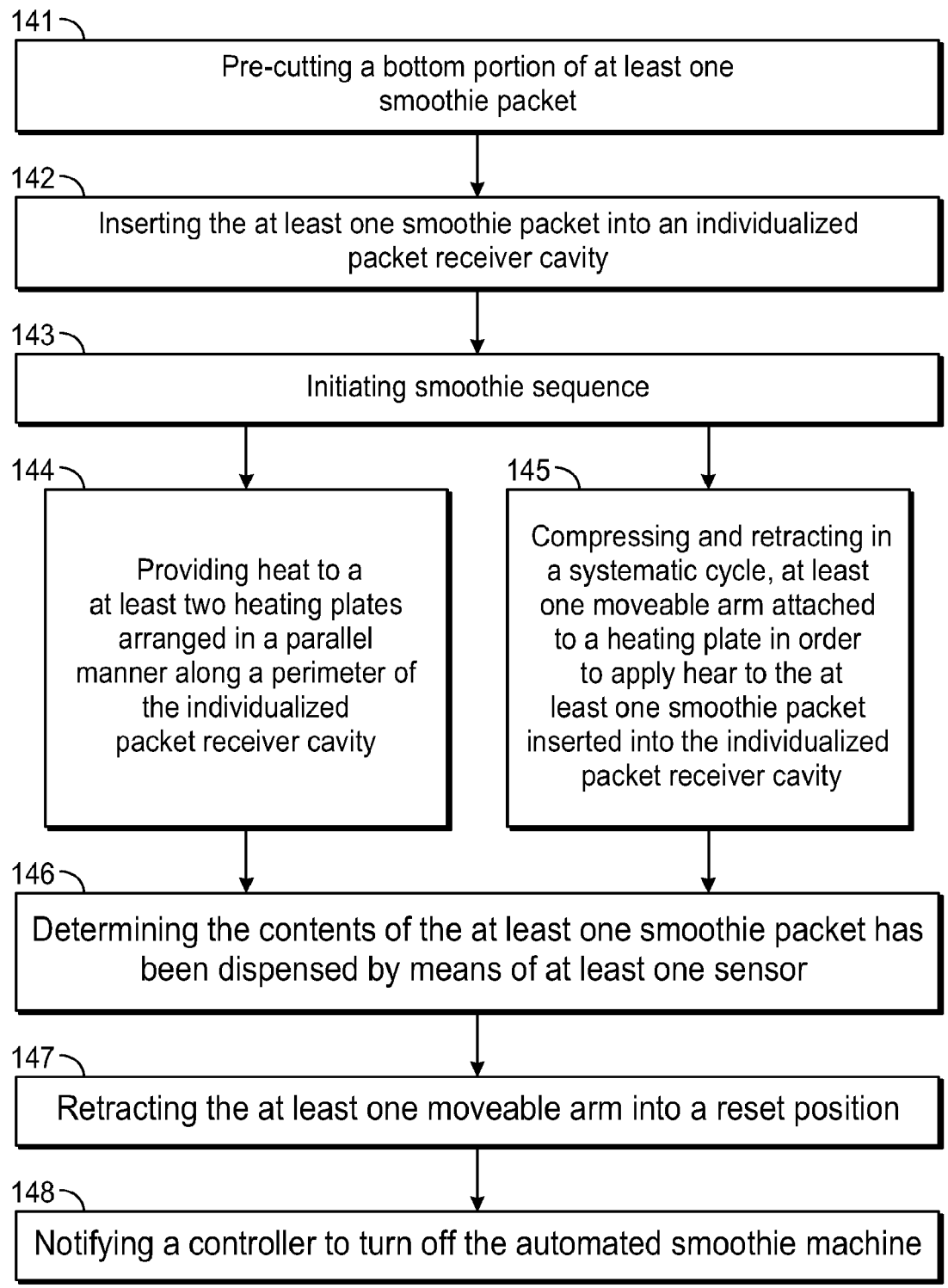
FIG. 4 is a flow diagram the describes an exemplary embodiment of a method of extracting food matter from the automated smoothie machine.

FIG. 4 is a flow diagram the describes an exemplary embodiment of a method of extracting food matter from the automated smoothie machine. The process begins with step 141, wherein the end user pre-cutting a bottom portion of at least one smoothie packet; step 142, inserting at least one smoothie packet into an individualized packet receiver cavity; step 143, initiating smoothie sequence; step 144, providing heat to at least two heating plates arranged in a parallel manner along a perimeter of the individualized packet receiver cavity; step 145, simultaneously with providing heat as in step 144, compressing and retracting in a systematic cycle, at least one movable arm attached to a heating plate in order to apply heat to the at least one smoothie packet inserted into the individualized packet receiver cavity; step 146, determining, by means of at least one sensor, the contents of at least one smoothie packet has been dispensed; step 147, retracting at least one movable arm into a reset position; step 148, notifying a controller to turn off the automated smoothie machine.

In a preferred embodiment of the process for which the automatic smoothie machines takes to produce a ready to drink smoothie in an on-demand manner will be described herein. As can be shown in FIG. 3, when the automatic smoothie machine is off, the button sensor three 120 is pressed. This takes place because in the off position, the mechanical arms are open and hitting the button sensor three 120. When the machine is on and running (after the user inserts the required packet(s), presses the button on the machine), the mechanical arms will begin to compress the frozen substance inside the packets. When the substance has fallen out of the packet (i.e.: the packet is flat and empty), the mechanic movable arms 107,108 will be completely closed and hitting the first button sensor 118 and the second button sensor 119. The first button sensor 118 and the second button sensor 119 tell the controller (not shown) that the packets are empty (or have dispensed their contents) and to reset the process. When the process is over, the movable arms 107,08 automatically open back up until at least one arm triggers the third button sensor 120. This tells the controller (not shown) the arms are open and the machine turns off.

Figure 5:
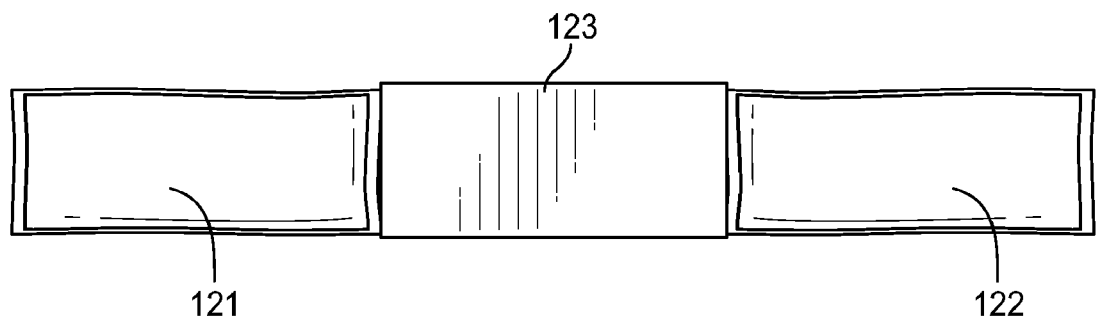
FIG. 5 is a schematic representation of one embodiment of a dual food packet.

FIG. 5 is an illustration of one embodiment of a dual food packet. In one embodiment, a first packet 121 and a second packet 122 having an intermediate spacing 123 between them. Wherein the first packet 121 and the second packet 122 are individually sealed compartments having food contents maintained therein. The intermediate spacing 123 may be comprised of plastic, nylon, paper, or other suitable materials.

In another embodiment, the smoothie packet is a basic plastic pouch (two-dimensional flat plastic bags) that are heat sealed along the seams. The packet sizing may be 18"×3.25" at 2 millimeters thick, but it's understood that these dimensions may vary without deviating from the heart of the invention. Moreover, the packet may be a pod, or a container of some sort without deviating away from the central them of pre-manufactured food packets that are inserted by an end user into a machine that ultimately applies heat and pressure to the packets in order to dispense its contents. The disclosure contemplates a first packet 121 and a second packet 122 that both go into the automatic smoothie machine 100, preferably, at the same time, and the intermediate spacing 123 (a.k.a. middle plastic spacing) of the plastic hangs on the top median to hold the two packets in place. This also aids in the fact that users do not need to reach into the machine to pull packets out and potentially burn themselves. The plastic spacing may be fused on both ends, joining a top end of a first packet and a top end a second packet. The intermediate spacing 123 (a.k.a. middle plastic spacing) may be flexible and not rigid.

Figure 6:
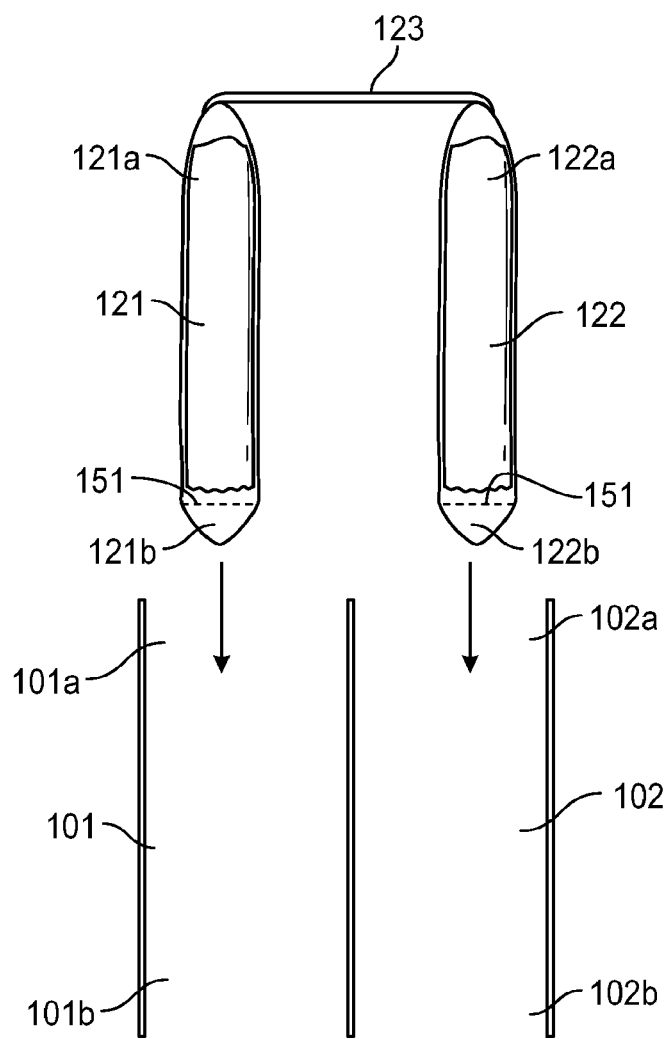
FIG. 6 is a schematic representation of one embodiment of a dual food packet being inserted into the automated smoothie machine.

FIG. 6 is an illustration of the dual food packet being inserted into the automated smoothie machine. In one embodiment, a dual food packet comprising a first packet 121 and a second packet 122 connected to one another thru an intermediate spacing 123 to allow the dual food packet to be inserted into a first opening 101 and a second opening 102, respectively. Once the dual food packet is inserted, the top of the first food packet 121a will align with the top of the first opening 101a, the bottom of the first food packet 121b will align with the bottom of the first opening 101b, the top of the second packet 122a will align with the top of the second opening 102a, and the bottom of the second packet 122b will align with the bottom of the second opening 102b. The bottom of the first food packet 121b and the bottom of the second food packet 122b may have a perforation 151 to allow for easy detachment by an end user. The two smoothie packets are maintained in a vertical position to allow the packets to be inserted into the respective opening in the automatic smoothie machine, wherein the intermediate spacing 123 is retained along the top of the openings to allow a user to pull the packets out once the smoothie contents are dispensed into the desired receptacle. This illustration utilizes three heating plates to heat two packets, it is also contemplated that four heating plates arranged vertically in a parallel manner may be used, and these four heating plates may be movable or non-movable by an external arm, and would still allow the packets to be received in two separate cavities and allow for heating and dispensing of the food matter into an external receptacle. Moreover, any number of parallel heating plates, movable or non-movable, may be arranged in order to produce any number of cavities suitable for receiving food packets.

FIG. 7 is an illustration of the single food packet being inserted into the automated smoothie machine. In one embodiment, a single packet 124 comprising a top portion of a single packet 124a and a bottom portion of a single packet 124b, wherein the bottom portion of a single packet 124b may be pre-cut 126 to allow the food contents of the single packet 124 to be dispensed by the automated smoothie machine 100. The single packet 124 configured to be slipped into a single opening 125, which is a region of empty space between a first vertical heating plate 131 and a second vertical heating plate 132, wherein the first opening 125 comprising a top portion of a single opening 125a configured to align with the top portion of the single packet 124a and the bottom portion of the single opening 125b configured to align with the bottom portion of the single packet 124b. The bottom portion of the single packet 124b may have a perforation 151 to allow for easy detachment by an end user.

Although this invention has been described in terms of certain preferred embodiments, other embodiments that are apparent to those of ordinary skill in the art, including embodiments which do not provide all of the benefits and features set for the herein, are also within the scope of this invention. Accordingly, the scope of the present invention is defined only by reference to the claims.

I claim:

1. An automatic smoothie machine, comprising:
three vertical heating plates arranged in a sequential parallel manner creating a pair of food cartridge cavities,
wherein the pair of food cartridge cavities are configured to each receive one of a pair of food cartridges connected by a unifying liner connecting a top portion of each of the pair of food cartridges, each of the pair of food cartridges comprising:
an external liner with a pre-cut dispensing outlet; and
a volume of food matter contained within the external liner,
wherein two of the three vertical heating plates are moveable and are arranged along opposite and outer sides of the pair of food cartridge cavities and one of the three vertical heating plates is non-moveable and arranged in between the pair of food cartridge cavities,
wherein the three vertical heating plates are configured to provide controlled heating and the two of the three vertical heating plates arranged along opposite and outer sides of the pair of food cartridge cavities are configured to provide a predetermined amount of cyclic pressure to the pair of food cartridges maintained within the pair of food cartridge cavities, and
wherein the pair of food cartridges are maintained within the pair of food cartridge cavities in a manner to allow the pre-cut dispensing end to be arranged along a bottom portion of each of the pair of food cartridge cavities in order to allow the volume of food matter to be ejected downwards.

2. The automatic smoothie machine of claim 1, wherein the two of the three vertical heating plates arranged along opposite and outer sides of the pair of food cartridge cavities are each attached to one of two moveable arms controlled by a motor.

3. The automatic smoothie machine of claim 2, wherein each of the two moveable arms initiate at least one sensor to terminate the predetermined amount of cyclic pressure and controlled heating when the volume of food matter within the food cartridge is fully dispensed downwards through the pre-cut dispensing outlet.

4. The automatic smoothie machine of claim 3, wherein at least one of the two moveable arms may initiate a subsequent sensor to terminate the operation of the automatic smoothie machine after the at least one sensor is initiated.

5. The automatic smoothie machine of claim 1, wherein the unifying liner may be used to extract the pair of food cartridges from the pair of food cartridge cavities.

6. The automatic smoothie machine of claim 1, further comprising a controller configured to continuously adjust a heating output value for a set duration to allow the volume of food matter within each of the pair of food cartridges to dispense along the pre-cut dispensing outlet.

7. An automatic smoothie machine, comprising:
a first outer heating plate, a second middle heating plate, and a third outer heating plate arranged in a sequential parallel manner, creating two separate chambers configured to each receive a single food cartridge, each of the single food cartridges comprising:

an external liner with a pre-cut dispensing end; and
a volume of food matter contained within the external liner; and
wherein the two separate chambers comprise:
a first chamber comprising the first outer heating plate and the second middle heating plate arranged along opposite ends of the first chamber; and
a second chamber comprising the second middle heating plate and the third outer heating plate arranged along opposite ends of the second chamber;
wherein the first outer heating plate and the third outer heating plate are configured to apply cyclic pressure onto the single food cartridge within the first chamber and the single food cartridge within the second chamber, respectively, while the second middle heating plate is stationary, and
wherein the pre-cut dispensing end of the single food cartridge of the first chamber is arranged along a bottom side of the first chamber and the pre-cut dispensing end of the single food cartridge of the second chamber is arranged along a bottom side of the second chamber to allow the volume of food matter to be ejected downwards.

8. The automatic smoothie machine of claim 7, wherein the first outer heating plate and the third outer heating plate are each attached to one of two moveable arms controlled by a motor.

9. The automatic smoothie machine of claim 8, wherein each of the two moveable arms initiate at least one sensor to terminate the cyclic pressure when the volume of food matter within the single food cartridge is fully dispensed through the pre-cut dispensing end.

10. The automatic smoothie machine of claim 9, wherein at least one of the two moveable arms may initiate a subsequent sensor to terminate the operation of the automatic smoothie machine after the at least one sensor is initiated.

11. The automatic smoothie machine of claim 7, further comprising a controller configured to continuously adjust a heating output value for a set duration to allow the volume of food matter within each of the single food cartridges to dispense along the pre-cut dispensing end.

\* \* \* \* \*